United States Patent [19]
Cliff

[11] 3,883,817
[45] May 13, 1975

[54] DIGITAL PHASE-LOCKED LOOP

[75] Inventor: Rodger A. Cliff, Upper Marlboro, Md.

[73] Assignee: United States Government National Aeronautics and Space Adm., Office of General Counsel-Code GP, Washington, D.C.

[22] Filed: Aug. 20, 1973

[21] Appl. No.: 389,929

[52] U.S. Cl. ........................ 331/1 A; 331/18, 331/25
[51] Int. Cl. ............................................ H03b 3/04
[58] Field of Search ......................... 331/1 A, 18, 25

[56] References Cited

UNITED STATES PATENTS 3,449,691 6/1969 Pasternack et al. ................ 331/1 A
3,715,751 2/1973 Mead ............................. 331/1 A X

*Primary Examiner*—Siegfried H. Grimm
*Attorney, Agent, or Firm*—Robert F. Kempf; Ronald F. Sandler; John R. Manning

[57] ABSTRACT

An all digital phase-locked loop derives a loop output signal from an accumulator output terminal. A phase detecting exclusive OR gate is fed by the loop digital input and output signals. The output of the phase detector is a bi-level digital signal having a duty cycle indicative of the relative phase of the input and output signals. The accumulator is incremented at a first rate in response to a first output level of the phase detector and at a second rate in response to a second output level of the phase detector.

3 Claims, 7 Drawing Figures

DIGITAL PHASE-LOCKED LOOP

ORIGIN OF THE INVENTION

The invention described herein was made by an employee of the U.S. Government and may be manufactured and used by or for the Government for governmental purposes without the payment of any royalties thereon or therefor.

FIELD OF THE INVENTION

The invention is generally related to the field of phase-locked loops and is particularly concerned with the provision of an all digital phase-locked loop.

BACKGROUND OF THE INVENTION

Prior art phase-locked loops for producing an output signal phase-locked to an input signal in general employ a phase detector for comparing the relative phase of the loop input and output signals. By low pass filtering the phase detector output there is derived an analog error signal proportional to the relative phase of the loop input and output signals. For a "type I" loop (a loop having one integration) the analog error signal is applied to a voltage controlled oscillator which produces a variable frequency signal, which is generally the loop output signal. Because the voltage controlled oscillator signal derives a frequency, or rate of change of phase, proportional to the analog signal magnitude, there is effectively an integration in the loop. A "type II" analog loop (a loop having two integrations) is generally mechanized by feeding the analog error signal to an analog integrator which drives the voltage controlled oscillator.

As is evident from the above discussion, prior art phase-locked loops have in general utilized analog filtering elements, analog voltage controlled oscillators, and analog integrators. These analog components suffer from drift, non-repeatability from unit-to-unit, and non-linearity. In addition, analog phase-locked loops have presented difficulties in switchably programming various loop parameters such as bandwidth, center frequency and type because of the necessity of mixing switching, i.e., digital circuits, with the loop analog circuitry. In addition, it has been difficult to set the instantaneous frequency of an analog loop to aid in its acquisition or initial lock on to an input signal.

A need exists for an all digital phase-locked loop which is simply mechanized. Such a loop would overcome the various difficulties that inhere in analog phase-locked loops. In addition such a loop could be mechanized at lower cost than analog loops and would involve less power dissipation.

OBJECTS OF THE INVENTION

It is an object of the present invention to provide a new and improved, simple, substantially all digital phase-locked loop.

It is another object of the present invention to provide a simple all digital phase-locked loop which has sufficient flexibility so that various phase-locked loop parameters may be switchably programmed.

SUMMARY OF THE INVENTION

An all digital phase-locked loop is provided having an accumulator with an output terminal for deriving the loop output signal. The term "accumulator" is used in a generic sense to describe devices such as counters, shift registers, recursive adders and other devices which pass through a plurality of internal states for each change of state at an input terminal. A digital phase detector, comprised of an exclusive OR gate, is fed with the loop input signal and the loop output signal. The phase detector has a digital or two-level output and an associated duty cycle indicative of the relative phase of the loop input and output signals. Means are provided for incrementing the accumulator, or making the accumulator pass through its internal states, at first and second different rates in response to the first and second output level of the phase detector.

Two main embodiments are disclosed. In the first embodiment, the loop is type I and the accumulator is a simple divide by K-counter which accumulates K-clock pulses in producing a "one-cycle" digital output variation. The counter includes an input terminal fed by first and second clock frequencies in response to the phase detector respectively deriving the first and second levels. In the second embodiment, particularly adapted for type II loops, the accumulator is a recursive adder, i.e., and adder which adds a variable number represented by an input signal to a total number represented by a signal previously stored in the adder. The number represented by the input signal is added to the accumulator contents at a rate determined by an input clock signal. If the input number is constant, the accumulator contents are incremented at a fixed rate. To increment the accumulator at a different rate as a function of the phase detector output signal level, means are provided for changing the input number in correspondence with the phase detector output level. The loop output signal is fed from an output terminal of the accumulator, such as a relatively high significant bit terminal indicating the accumulator contents or an accumulator overflow terminal.

The above and still further objects, features, and advantages of the present invention will become apparent upon consideration of the following detailed description of specific embodiments thereof, especially when taken in conjunction with the accompanying drawing wherein:

DETAILED DESCRIPTION OF THE INVENTION

Figure 1:
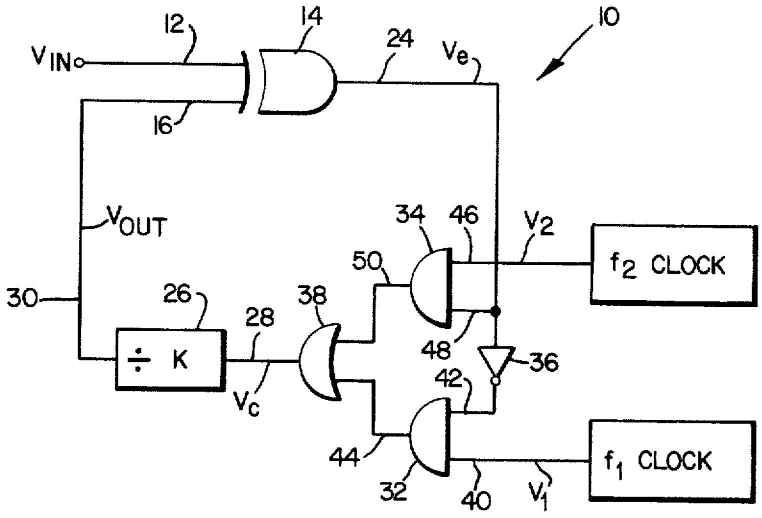
FIG. 1 is a first embodiment of the digital phase-locked loop of the invention wherein an accumulator is a counter and two clock signals are provided for incrementing the counter.
Figure 2:
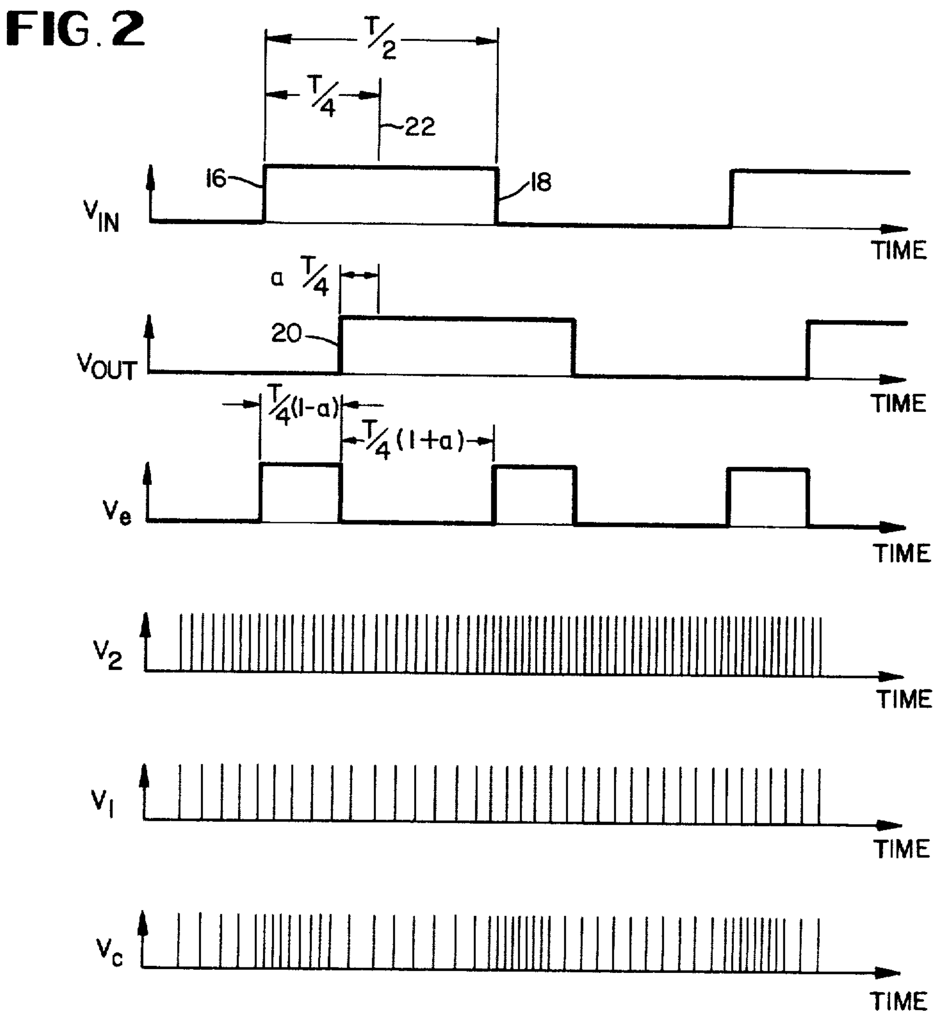
FIG. 2 is a timing diagram for the signal waveforms at various points in the phase-locked loop of FIG. 1 with a parameter *a* indicating the phase shift between loop input and output signals when the loop is locked.

Reference is made to FIGS. 1 and 2, wherein a first embodiment 10 of a type I all digital phase-locked loop is illustrated. In this loop, an input square wave digital signal, $V_{in}$, of frequency $f$ and period T is applied to one input terminal 12 of a digital phase comparing, exclusive-OR gate 14 (also known as a modulo 2 adder). The output square wave digital signal, $V_{out}$, generated by the loop 10 is applied to a second input terminal 16 of gate 14. The loop is assumed to be locked, i.e., $V_{out}$ is assumed to be at the same frequency as $V_{in}$, an assumption that is verified as the discussion proceeds. $V_{out}$ is further assumed to be lagging $V_{in}$ in phase, by a parameter described as $a$ where $a$ indicates the fraction of 90° which $V_{out}$ deviates from a 90° phase lag of $V_{in}$. The time between a rising edge 16 of $V_{in}$ and the next falling edge 18 of $V_{in}$ is a half period, $T/2$, of the frequency for $V_{in}$. If $a$ equals zero and therefore $V_{out}$ lags $V_{in}$ by 90°, the rising edge 20 of $V_{out}$ occurs exactly a quarter of a period, i.e., $T/4$, after the rising edge 16 of $V_{in}$. However, with $a$ positive, rising edge 20 occurs less than a quarter period after rising edge 16 while with $a$ negative, rising edge 20 occurs more than a quarter period after rising edge 16. The time which rising edge 20 of $V_{out}$ occurs in advance of a 90° phase lag position 22 is given by:

$$aT/4 \tag{1}$$

Output 24 of exclusive-OR gate 14 is a digital loop error signal, $V_e$, having a rectangular wave form and duty cycle indicative of the relative phases between $V_{in}$ and $V_{out}$. Exclusive-OR gate 14 respectively derives binary zero and one values in response to its input signals $V_{in}$ and $V_{out}$ being at the same and different binary levels. Thus, $V_e$ is a periodic signal repeating twice for each cycle of $V_{in}$ or $V_{out}$ such that $V_e$ has a binary one level for the period of time between rising edge 16 of $V_{in}$ and rising edge 20 of $V_{out}$ and a binary zero level for the period of time between rising edge 20 $V_{out}$ and falling edge 18 of $V_{in}$. The time while $V_e$ is a binary one is given by:

$$T/4\ (1-a) \tag{2}$$

while the time $V_e$ is binary zero is given by:

$$T/4\ (1+a) \tag{3}$$

It is clear from Expressions (2) and (3) that $V_e$ is a symmetrical square wave when $a$ equals zero and is an unsymmetrical rectangular wave when $a$ differs from zero.

The instantaneous level of $V_e$ controls the selection of either a first clock signal $V_1$ or a second clock signal $V_2$, respectively having differing frequencies $f_1$ and $f_2$, for incrementing an accumulator that comprises "divide by K" counter 26 at different rates. In the present description, it is assumed that $f_2$ is greater than $f_1$, although the converse could be true. A pulse train, $V_c$, or other digital signal selectively having one of the frequencies $f_1$ or $f_2$, is supplied to counter 26 on input line 28 and a square wave signal $V_{out}$, having a frequency controlled by the relative times that frequencies $f_1$ and $f_2$ are supplied, is derived from the counter on output line 30. In response to $V_e$ having binary zero and one values, the $f_1$ and $f_2$ signals are respectively coupled to or gated through to the counter line 28.

The selective gating or coupling of the $f_1$ or $f_2$ clock signals to counter 26 in response to the level of $V_e$ is accomplished by a combination of AND gate 32 and 34, an inverter 36 and an OR gate 38. Clock signal $V_1$ is connected to a first input terminal 40 of AND gate 32 while $V_e$ is coupled via inverter 36 to the other input terminal 42 of AND gate 32. The $V_1$ clock signal is derived on output line 44 of AND gate 32 when $V_e$ is a binary zero since a binary one is derived on line 42; however, output line 44 is a binary zero when $V_e$ is a binary one since a binary zero is derived on line 42. Clock signal $V_2$ is connected to one input terminal 46 of AND gate 34 and coupled through the AND gate to output line 50 while $V_e$ has a binary one by virtue of the output of gate 14 being connected to the other input terminal 48 of AND gate 34. Therefore, at any given time one of output lines 50 and 44 is supplied with a pulse type clock signal while no signal is supplied to the other of the lines. Lines 44 and 50 feed OR gate 38 which derives the output signal $V_c$ on line 28 that is connected to the input of counter 26. Hence, the $V_c$ signal alternates between a clock pulse frequency of $f_1$ when $V_e$ is a binary zero and a clock pulse frequency $f_2$ when $V_e$ is a binary one.

The frequency of $V_{out}$ may now be checked to describe the phase-locking mechanism of the FIG. 1 embodiment whereby $V_{in}$ is phase displaced from $V_{out}$. It is first observed that the frequency of $V_{out}$ is dependent on the relative phase of $V_{in}$ and $V_{out}$. If $V_{in}$ and $V_{out}$ were in phase, $V_e$ would always be a binary zero, and consequently $V_1$ would always be applied to counter 26. In that case, the frequency of $V_{out}$ would always be $f_1/K$, where $K$ is the frequency division factor of counter 26. On the other hand, if $V_{in}$ and $V_{out}$ were 180° out of phase, $V_e$ would always be a binary one and consequently $V_2$ would always be applied to counter 28 producing an output frequency $f_2/K$. As a further example, if $V_{in}$ and $V_{out}$ were 90° out of phase, $V_e$ would be a symmetrical square wave. In that case, $V_1$ would be applied to counter 28 half of the time and $V_2$ would be applied to counter 28 the other half of the time to yield a counter average output frequency of $f_1 + f_2/2K$. It should be apparent that any output frequency between $f_1/K$ and $f_2/K$ can be produced at counter line 30 dependent on the duty cycle of $V_e$. It is more convenient to relate the frequency of $V_{out}$ to the parameter $a$. The number of counts delivered from $V_1$ to counter 26 per period of $V_{out}$ is:

$$f_1 \frac{T}{2}(1-a) \tag{4}$$

The number of counts delivered from $V_2$ to counter 26 per period of $V_{out}$ is:

$$f_2 \frac{T}{2}(1+a) \tag{5}$$

By adding the number of counts in Equations (4) and (5) and dividing by the period an effective average input clock rate to counter 26 over one period of $V_{in}$ is determined as:

$$f\text{ effective} = \frac{f_1}{2}(1-a) + \frac{f_2}{2}(1+a) \quad (6)$$

Figure 3:
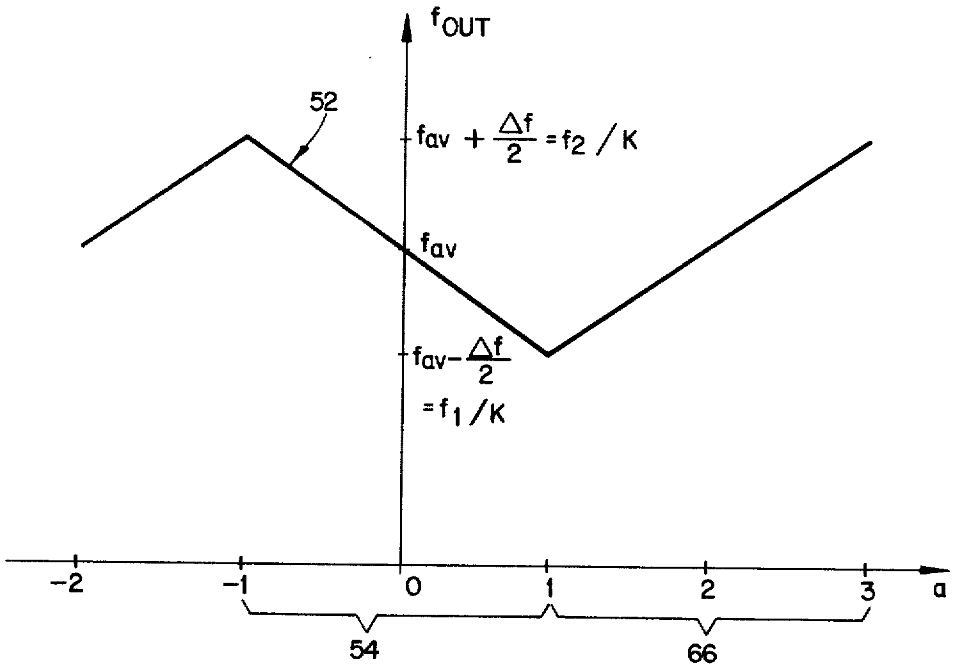
FIG. 3 is a graph showing the output frequency of the loop of FIG. 1 versus *a*.

Dividing the effective input clock rate by $K$, counter 26 output frequency is:

$$f_{out} = f_{av} - \frac{a}{2}\Delta f \quad (7)$$

where:

$f_{out}$ = the frequency of $V_{out}$, $f_{av} = \frac{f_1 + f_2}{2K}$, $\Delta f = \frac{f_2 - f_1}{K}$, and $-1 \leq a \leq +1$ Equation (7) actually describes a repeating triangular curve 52 because of the cyclical nature of phase relationships. Curve 52 of $f_{out}$ versus $a$ is shown in FIG. 3, from which it is seen that the output frequency is linearly related to $a$ and of a negative slope in the region 54 where the magnitude of $a$ is less than 1. Thus, the loop locks onto an input signal $V_{in}$ of frequency $f_{av}$ by producing an output signal $V_{out}$ lagging $V_{in}$ by 90°. For other input frequencies between the extremes $f_1/K$ and $f_2/K$, the loop locks with a different phase relationship. These characteristics indicate a linear Type I loop. It is also noted that if $f_1$ were greater than $f_2$, the curve would have a positive slope in the region 54 where the value of $a$ is between −1 and 1; the loop will not lock in region 54, but locks in an adjacent region of the triangular waveform where the slope is opposite, such as region 66 where the value of $a$ is between +1 and +3. Thus, if $f_1$ exceeds $f_2$, the loop, when the input signal $V_{in}$ has a frequency of $f_{av}$, locks with $V_{out}$ leading (rather than lagging) $V_{in}$ by 90°.

The differential equation of the dynamics of this loop is conveniently derived using the following relationships:

$$a = \frac{\Theta_{out} - \Theta_{in}}{\pi/2} \quad (8)$$

$$\dot{\theta}_{out} = 2\,\pi f_{out} \quad (9)$$

where:

$\theta_{in}$ = phase of $V_{in}$, $\theta_{out}$ = phase of $V_{in}$ with respect to the 90° lag position 22, and $\dot{\theta}_{out}$ = time derivative of $\theta_{out}$.

By substituting Equations (8) and (9) into Equation (7), one obtains the following equation:

$$\dot{\theta}_{out} = 2\Delta f\,\theta_{out} = 2\pi f_{av} + 2\Delta f\,\theta_{in} \quad (10)$$

Figure 4:
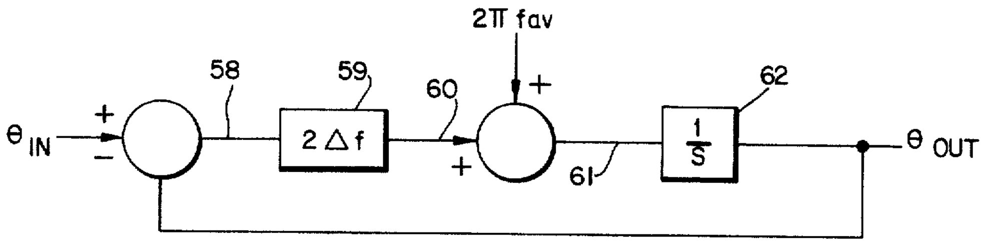
FIG. 4 is a schematic mathematical representation of the loop of FIG. 1 for indicating the loop dynamics.

This equation is mathematically represented by the Type I servo loop shown in FIG. 4. In this representation, the output phase $\theta_{out}$ is substracted from the input phase $\theta_{in}$ to form an error signal on line 58, which error signal is multiplied by a gain of $2\Delta f$ in amplifier 59 to produce a magnified error signal on line 60. A rate aiding signal of $2\pi f_{av}$ is next added to the error signal on line 60 to form a resultant sum on line 61. This resultant is integrated in integrator 62 to form the output phase $\theta_{out}$.

It should be apparent that the loop of FIG. 1, rather than acting exactly as the mathematical model of FIG. 4, exhibits discrete jumps in phase and consequent quantizing noise because of the discrete nature of the counts delivered to counter 26. Therefore, the division ratio $K$ of counter 26 should be chosen as large as possible so that these discrete phase jumps will be small. A value for $K$ of 256 (an eight stage counter) appears reasonable for most applications.

Figure 5:
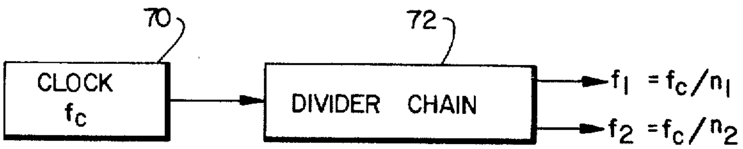
FIG. 5 is a schematic diagram of means for producing the two clock signals of FIG. 1 from a single high frequency clock.

In a modification of FIG. 1, shown partially in FIG. 5, the clock signals $V_1$ and $V_2$ (having frequencies $f_1$ and $f_2$ respectively are derived from a single clock source 70 which feeds a chain of dividers or counters 72. $V_1$ and $V_2$ are derived from divider 72 by selectively connecting taps to differing stages of the divider to provide frequency division of the clock frequency by various numbers. It is clear that the basic loop 10 may be packaged as a unit and different signals $V_1$ and $V_2$ synthesized from a divider chain may be applied to clock input lines 46 and 40 of the package to set the loop center frequency and dynamic range or bandwidth. It should also be apparent that one clock input signal may not be applied at all to give the loop a range of output frequencies from d.c. (zero frequency) to the frequency on the other clock line divided by $K$. Alternately a voltage controlled oscillator (VCO) might provide the two clock signals when the two level $V_e$ signal is applied to the VCO analog input. For such an application the VCO need not be linear.

Figure 6:
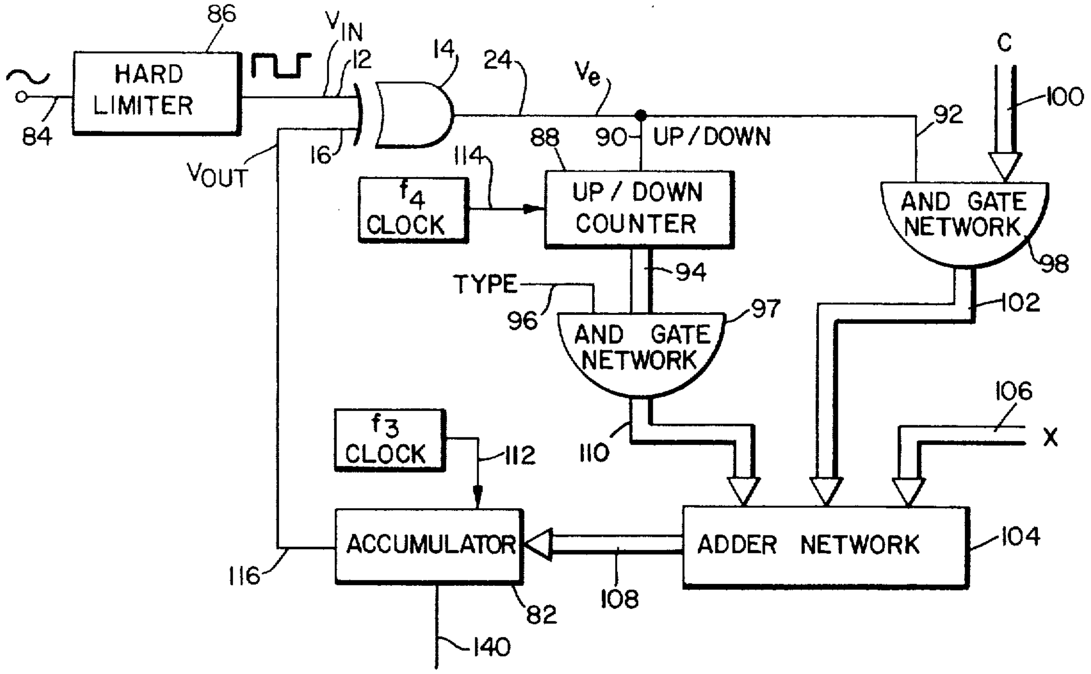
FIG. 6 is a second embodiment of the digital phase-locked loop of the invention where the accumulator is a recursive adder.

Referring next to FIG. 6, a second embodiment of the all digital phase-locked loop is shown. The embodiment is particularly adapted to include a type II loop since the accumulator is recursive adder 82. In the alternative, the FIG. 6 embodiment can be a type I loop, depending upon the value of an input control signal applied to lead 96.

A digital input signal $V_{in}$ is applied to exclusive OR gate 14 via input line 12. The signal on line 12 can be derived from an analog sinusoidal signal source 84 that is converted to a binary signal by a zero crossing detector or hard limiter 86 to produce the digital input signal $V_{in}$. The loop output signal $V_{out}$ is derived from a relatively high significance bit terminal or from an overflow terminal of the accumulator 82 to provide a fixed frequency division factor for a binary input signal to the accumulator. The $V_{out}$ output of accumulator 82 and the $V_{in}$ signal are applied to input terminals of exclusive OR gate 14 which derives variable duty cycle loop error signals $V_e$ at its output terminal 24. A mixer can replace the exclusive OR gate as a digital phase detector, if the loop input and output signals both have equal positive and negative excursions, i.e., have no d.c. component. If the input and output loop signals are bipolar square waves, the mixer produces the digital signal $V_e$. If, however, the input signals are sinusoids having zero d.c., the phase detector comprises a mixer driving a zero crossing detector or hard limiter to produce the digital signal $V_e$.

The level of the loop error signal $V_e$ is applied to leads 90 and 92 to respectively control the counting direction of up/down counter 88 and the gating of each of the parallel bits of an input signal representing a number $c$. The number represented by the signal derived on parallel output lines 94 of up/down counter 88 is gated by a "type" controlling signal on line 96 that drives AND gate network 97 whereby when the signal on line 96 is a binary zero the up/down counter does not effect the loop operation and the loop is Type I.

The discussion shall proceed with the assumption that the loop is operated as the simple Type I embodiment of FIG. I. The signal on line 92, controlling the gating of number $c$ is applied to a group of gates 98, one gate for each bit of the signal representing the number $c$ on parallel lines 100. When $V_e$ is a binary zero, all of the parallel bits on output lines 102 of AND gates network 98 have a binary zero level, representing the number zero. However, when $V_e$ is binary one level, the signal on output lines 102 has a bit pattern representative of the number $c$. Output lines 102 are applied to adder network 104 which is also fed by another binary signal representative of the constant number $x$ on parallel lines 106. Adder network 104 adds the number indicating signals on lines 102 and 106 and produces the resultant binary sum signal on its output parallel lines 108. Actually, adder network 104 adds a third number indicating signal on lines 110 to the other two signals, but the magnitude of the signal on line 110 fed from the up/down counter via AND gate network 97 is zero with the type line 96 in a binary zero state. Thus, adder network 104 derives a signal indicative of the number $x$ when $V_e$ is a binary zero and a signal representing the number $c + x$ when $V_e$ is a binary one. The signals on lines 108 are applied to accumulator 82 which is clocked at a constant rate $f_3$ via clock input line 112. Thus, when $V_e$ is a binary zero, the accumulator 82 is incremented at a slow rate given by:

$$f_3 \, x \tag{11}$$

and when $V_e$ is a binary one, the accumulator is incremented at a faster rate given by:

$$f_3 \, (c + x) \tag{12}$$

Thus, the relationships derived with respect to the FIG. 1 embodiment apply once $f_{av}$ and $\Delta f$ are determined.

With the type control line 96 maintained at a binary one level, an all digital type II phase-locked loop is provided such that up/down counter 88 counts at a fixed rate determined by the input clock frequency $f_4$ which clocks the counter via input line 114. $V_e$ controls the counting direction of counter 88; when $V_e$ is a binary zero or one, the number indicating signal of counter 88 respectively linearly reduces and increases at the fixed counting rate $f_4$. The number pattern of the output signal of up/down counter 88 represents the integral of $V_e$ (if $V_e$ were bipolar). Furthermore, the output frequency of accumulator 82 on line 116, with $V_e$ a binary one, for example, exhibits a linearly increasing frequency because the average number represented by the signal derived from adder 104 over the period $T$ linearly increases in such a situation. Thus, it is apparent that when the type line 96 carries a binary one signal a second order loop is provided.

Figure 7:
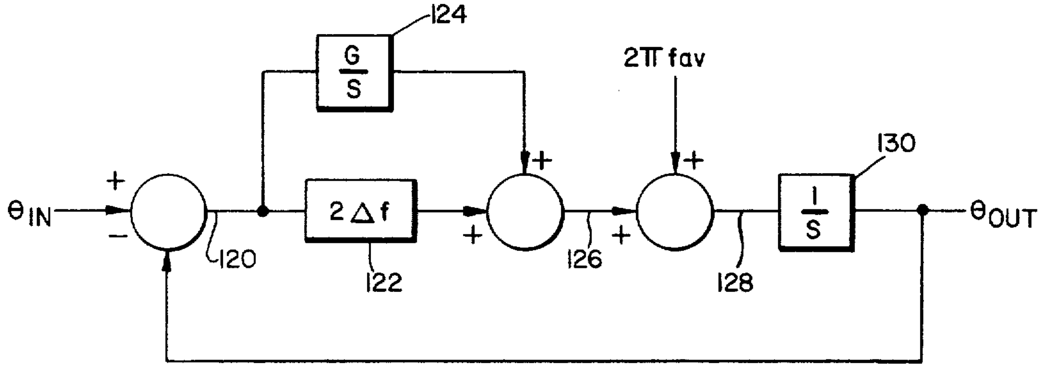
FIG. 7 is a schematic mathematical representation of the loop of FIG. 6 for indicating the loop dynamics.

The dynamics of a second order loop are mathematically represented by the type II servo loop of FIG. 7 wherein an output signal, $\theta_{out}$, is substracted from an input signal $\theta_{in}$ to produce a phase error signal on line 120. The signal on line 120 is fed in parallel to a variable gain device 122, having a gain of $2\Delta f$, and to an integrator 124 having a transfer function $G/s$. The gain factor $\Delta f$ is set by the magnitude of the signal representing $c$ to provide a loop damping component. The value of $G$ is set by a relative scaling factor of the numbers represented in up/down counter 88 and by clock frequency $f_4$. Output signals from the variable gain device 122 and integrator 124 are added to produce a signal on line 126. A rate aiding signal $2\pi f_{av}$, equal to the sum of the amplitudes of $x$ and $c/2$, is added to the signal on line 126 to produce a signal on line 128 which is integrated by integrator 130 to produce the output signal $\theta_{out}$. It should be apparent that the numbers represented by $c$ and $x$ and/or the clock frequencies $f_3$ and $f_4$ may be changed to produce different center frequencies and dynamic loop characteristics. During lock-on, a phase-locked loop is generally operated in a type I mode. This is easily done by maintaining the signal type line 96 in the binary zero state. The loop might be separately optimized in this type I mode by switchably changing the loop parameters, particularly the magnitude of the signal representing the number $c$. Also the loop is easily initialized with an output frequency prior to lock-on by setting the level of the signal representing the number $x$. Furthermore, the initial phase of the output signal is conveniently set by clearing or zeroing the contents of accumulator 82 at an appropriate time via clear line 140.

Having described specific embodiments of my invention, it should be apparent that numerous modifications and equivalents are possible within its spirit and scope. It is intended that my invention not be limited except with reference to the following claims.

What is claimed is:

1. A phase-locking apparatus for producing a system output signal having a phase which is responsive to the phase of an input signal comprising:
   - phase detector means responsive to the input and system output signals for deriving a two state output signal from the phase detector means having a variable duty cycle indicative of the relative phase of the input and system output signals;
   - an accumulator having an output terminal on which is derived said system output signal; and
   - incrementing means including means for adding a signal representing a first constant to the accumulator at a fixed rate in response to the first output state of the phase detector and means for adding to the accumulator a signal representing a second constant at the fixed rate in response to the second output state of the phase detector.

2. The apparatus of claim 1 in combination with means for adding a signal representing a variable number to the accumulator at the fixed rate, where said variable number is dependent upon the integral of the output of the phase detector.

3. The apparatus of claim 2 wherein said varying number adding means includes an up/down counter having a counting direction controlled by the phase detector output state.

* * * * *